United States Patent [19]

Grogan

[11] Patent Number: 4,651,423
[45] Date of Patent: Mar. 24, 1987

[54] CHAIN SAW CUTTING CHAIN SAFETY STOP

[76] Inventor: Victor A. Grogan, R.D. #1, Hayes Rd., Schaghticoke, N.Y. 12154

[21] Appl. No.: 854,813

[22] Filed: Apr. 23, 1986

[51] Int. Cl.[4] .................. B27B 17/02; B60T 13/04
[52] U.S. Cl. .................................... 30/382; 188/77 R
[58] Field of Search .............................. 30/381–387; 188/77 R, 166

[56] References Cited

U.S. PATENT DOCUMENTS

| | | | |
|---|---|---|---|
| 3,664,390 | 5/1972 | Mattson et al. | 30/381 |
| 3,776,331 | 12/1973 | Gustafsson | 30/382 UX |
| 3,934,345 | 1/1976 | Hirschkoff | 30/381 |
| 3,964,333 | 6/1976 | Hirschkoff | 30/381 |
| 3,991,469 | 11/1976 | Frederickson | 30/381 |
| 3,991,864 | 11/1976 | Muller | 30/381 |
| 3,992,779 | 11/1976 | Marks et al. | 30/381 |
| 4,026,392 | 5/1977 | Hirschkoff | 30/381 |
| 4,121,339 | 10/1978 | Nikolich | 30/381 |
| 4,156,477 | 5/1979 | Nagashima et al. | 30/381 |
| 4,324,045 | 4/1982 | Hoppner et al. | 30/381 |
| 4,334,357 | 6/1982 | Baricevic | 30/381 |
| 4,426,563 | 1/1984 | Grogan | 30/381 |

Primary Examiner—Douglas D. Watts

[57] ABSTRACT

Disclosed is a safety stop that is operatively connected to the existing rotatively mounted front handle of a chain saw to independently actuate such safety stop to its actuated position to stop the rotation of the cutting chain upon rotation of such rotatively mounted front handle either automatically when "kick-back" occurs or upon such rotation by the operator at his option.

5 Claims, 4 Drawing Figures

CHAIN SAW CUTTING CHAIN SAFETY STOP

BACKGROUND OF THE INVENTION

1. Technical Field

This invention relates to a chain saw cutting chain safety stop that is operatively connected to an existing rotatively mounted front handle of a chain saw and is independently actuated by the rotative action of such front handle to stop the cutting chain.

2. Background Art

The prior art, U.S. Pat. No. 3,664,390 discloses safety means for power driven chain saws; U.S. Pat. No. 3,776,331 discloses a brake device for power saws; U.S. Pat. No. 3,934,345 discloses a snap-acting over-center chain saw safety brake and method of operation thereof; U.S. Pat. No. 3,964,333 discloses a safety braking mechanism for a portable chain saw; U.S. Pat. No. 3,991,469 discloses a safety braking mechanism for a portable chain saw; U.S. Pat. No. 3,991,864 discloses a motor saw, especially motor chain saw; U.S. Pat. No. 3,992,779 discloses a chain brake for chain saws; U.S. Pat. No. 4,026,392 discloses a snap-acting over-center chain saw safety brake and method of operation thereof; U.S. Pat. No. 4,121,339 discloses a safety brake mechanism for chain saws; U.S. Pat. No. 4,156,477 discloses a braking system of a chain saw; U.S. Pat. No. 4,324,045 discloses a motor chain saw with dynamic safety braking device; U.S. Pat. No. 4,334,357 discloses a safety braking apparatus for a portable chain saw; U.S. Pat. No. 4,426,563 discloses a chain saw safety switch.

The following discussion focuses on the problems inherent in the prior art and how this invention contributes to the solution of such prior art problems.

"Kick-Back" means that the outgoing run of the cutting chain is jammed, caught or otherwise encounters resistance thereby causing the cutter bar, mounting such cutting chain to be thrown back towards the operator, causing serious injury or even death. For example, a right handed operator grasps and holds the chain saw with his left hand holding a cross-wise, gripping front handle and his right hand holding a rear control handle aligned with the front to rear longitudinal axis of such chain saw. When "Kick-Back" occurs, the operator's left hand, holding such cross-wise front handle rotates on such front handle as the chain saw rotates towards him, thus sending the cutter bar in his direction. In certain circumstances, the operator of a chain saw may loose his balance and fall on his running chain saw, the result being very serious injury or possibly even death.

The prior art; U.S. Pat. No. 3,664,390; U.S. Pat. No. 3,776,331; U.S. Pat. No. 3,934,345; U.S. Pat. No. 3,964,333; U.S. Pat. No. 3,991,469; U.S. Pat. No. 3,991,864; U.S. Pat. No. 3,992,779; U.S. Pat. No. 4,026,392; U.S. Pat. No. 4,121,339; U.S. Pat. No. 4,156,477; U.S. Pat. No. 4,324,045 and U.S. Pat. No. 4,334,357 relate to chain stopping devices to prevent injuries related to "Kick-Back". The drawback of said proposals being the loss of time between the start of the "Kick-Back" or "Throw" of the cutter bar and the actuation of said chain stopping devices. Also, these proposals are intended for the occurance known as "Kick-Back", but are not designed to prevent injury to the operator in other accident situations, such as an operator falling on his running chain saw. U.S. Pat. No. 4,426,563 relates to a hand held, rotatively mounted front handle of a chain saw to shut off the ignition to the power source of such chain saw, either automatically, as in "Kick-Back" or at the operator's option in other accident situations. Although this proposal puts control to shut off the power source of the saw in the operator's hand, which is holding the front handle, it is understood that even though the driving force to the cutting chain is removed, said cutting chain may continue to freely rotate for a short period of time as it comes to a stop. In this situation, it is possible for the operator to come in contact with the cutting chain as it is coming to a stop.

It is the object of this invention to contribute to the solution of such prior-art problems by providing a safety chain stopping device that is operatively connected to an existing rotatively mounted front handle of a chain saw. Said chain stopping device being actuated to quickly stop the cutting chain by the rotative action of said rotatively mounted front handle. It is understood that, since this invention is actuated to stop the cutting chain by the action of the front handle, while being held by the operator, said actuation takes place instantly. It is the further object of this invention to provide a means of quickly stopping the cutting chain of a chain saw that is uncomplicated in design and can be adapted to either gasoline engine powered chain saws or electric motor powered chain saws. After the safety stop has been actuated to its chain stopping position, it must be reset to its "Run" position before the cutting chain will freely rotate.

It is another object of the present invention to provide the operator with a great amount of control to quickly stop the cutting chain in various accident situations. Present invention is actuated automatically by the rotatively mounted front handle when kick-back causes the front handle to rotate in the operator's hand or by the operator manually rotating the front handle at his option.

SUMMARY OF THE INVENTION

In accordance with the invention, there is provided a chain saw cutting chain safety stop device that is operatively connected to an existing rotatively mounted front handle of a chain saw to quickly stop the cutting chain upon rotation of said rotatively mounted front handle.

BRIEF DESCRIPTION OF THE DRAWINGS

This object and other objects of the invention should be discerned and appreciated by reference to the drawings, wherein like reference numerals refer to similar parts throughout the several views, in which.

DESCRIPTION OF THE PREFERRED EMBODIMENT

Figure 1A:
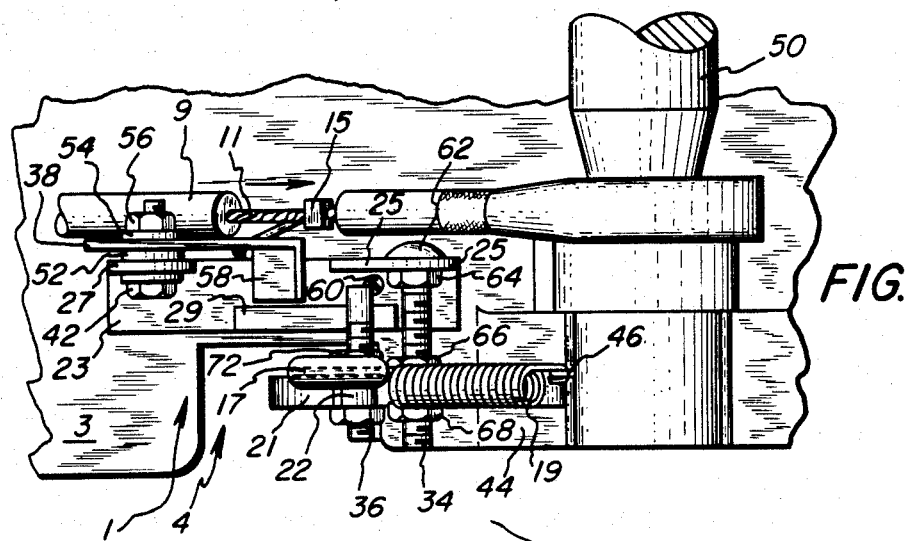
FIG. 1a provides a top fragmentary, partial view of a chain saw immediately associated with the safety chain stopping mechanism of the present invention and showing the stopping mechanism in a braking posture.

To facilitate understanding of the invention, a nomenclature list is herewith provided:

1 generally refers to the invention 3 saw housing
4 elongated opening in saw housing 3
5 chain cutter bar
7 cutting chain carried on cutter bar 5
9 cable sheath
11 cable operatively connected to rotatively mounted front handle 50
13 linkage
14 curved end of linkage 13
15 fixed plug carried on cable 11
16 mounting aperture in trigger leg 39
17 brake band reset grip operatively connected to brake band 21
19 torsion spring
21 flexible brake band
22 looped end of flexible brake band carried on actuating shaft 36
23 mounting bracket
24 looped end of brake band carried on anchor shaft 34
25 brake band anchor shaft mounting pedistal fixed to mounting bracket 23
27 actuating shaft trigger mounting pedistal fixed to mounting bracket 23
29 actuating shaft guide fixed to mounting bracket 23
30 centrifugal clutch
32 outer drum of centrifugal clutch 30
34 threaded fixed end anchor shaft
36 partically threaded brake band actuating shaft
38 actuating shaft trigger
39 leg of actuating shaft trigger 38
40 recess incorporated in actuating shaft guide 29
42 actuating shaft trigger mounting bolt
44 front handle pedistal mount fixed to saw housing 3
46 torsion spring connecting aperture on front handle pedistal 44
48 torsion spring connecting aperture on brake band reset grip 17
50 rotatively mounted front handle
51 operator's hand holding front handle 50
52 washer carried on trigger mounting bolt 42
54 washer carried on trigger mounting bolt 42
56 locking nut carried on trigger mounting bolt 42
58 foot of actuating shaft trigger 38
60 machine screws (two) afixing mounting bracket 23 to housing 3
62 fixed end anchor shaft head
64 locking nut carried on fixed end anchor shaft 34
66 locking nut carried on fixed end anchor shaft 34
68 locking nut carried on fixed end anchor shaft 34
70 locking nut carried on threaded end of actuating shaft 36
72 locking nut carried on threaded end of actuating shaft 36

Reference numeral 1 generally refers to the invention of the chain saw cutting chain safety stop.

Figure 1:
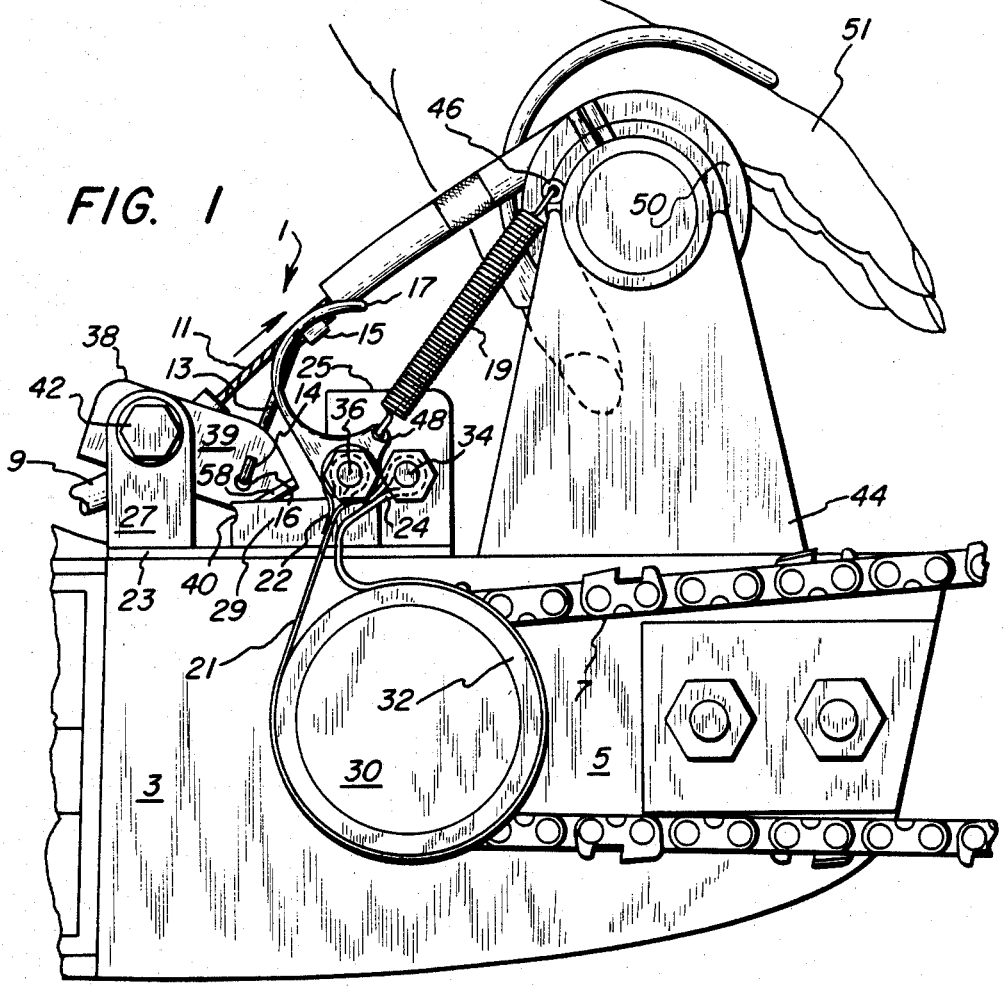
FIG. 1 Provides a side fragmentary, partial elevational view of that portion of a chain saw (with cover removed) immediately associated with the safety chain stopping mechanism of the present invention and showing the cutter chain in a braked condition.

In FIG. 1 there is depicted a preferred form of the invention embodied in a portable chain saw which carries a rotatively mounted front hande. Shown is the present invention operatively connected to said rotatively mounted front handle.

A chain saw includes a housing 3. Fixed to housing 3 is a pedistal mount 44, on which is carried a rotatively mounted front handle 50 that operatively carries a cable 11 freely received in cable sheath 9. The rotatively mounted front handle 50 is grasped and held by the operator's hand 51.

A chain cutter bar 5 projects forwardly from the housing 3 and freely carries a cutter chain 7 for endless movement therearound. The cutter chain 7 is driven by the power source of the chain saw, be it electric motor or gasoline engine. Driving force is administered from the power source to the cutter chain 7 by means of the centrifugal clutch 30.

Shown in FIG. 1 is the mounting bracket 23 of the present invention. Mounting bracket 23 fixedly carries as parts thereof an anchor shaft mounting pedistal 25, a trigger mounting pedistal 27 and a actuating shaft guide 29. A complimental recess 40 is shown formed in the end of actuating shaft guide 29 that faces the rear of housing 3. Recess 40 is engageable by the partially threaded brake band actuating shaft 36 to releaseably lock actuating shaft 36 in its pre-actuation posture.

Carried on the threaded end of actuating shaft 36 by means of locking nut 70 and locking nut 72 is a looped end 22 of flexible brake band 21 and a reset grip 17 via drilled hole (not shown). Reset grip 17 being non-pivotly mounted by means of extended lips (not shown) abutting each side of looped end 22.

Figure 2A:
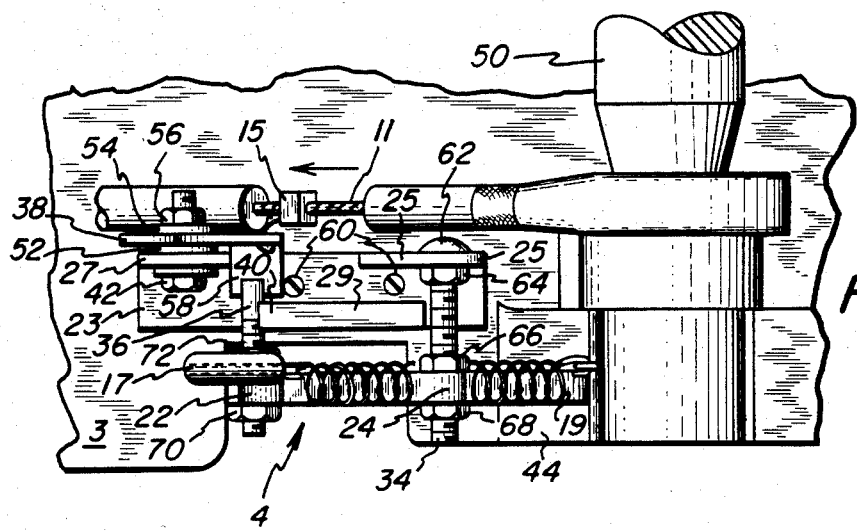
FIG. 2a is a view similar to FIG. 1a wherein the chain stopping mechanism is in a non-braking posture.
Figure 2:
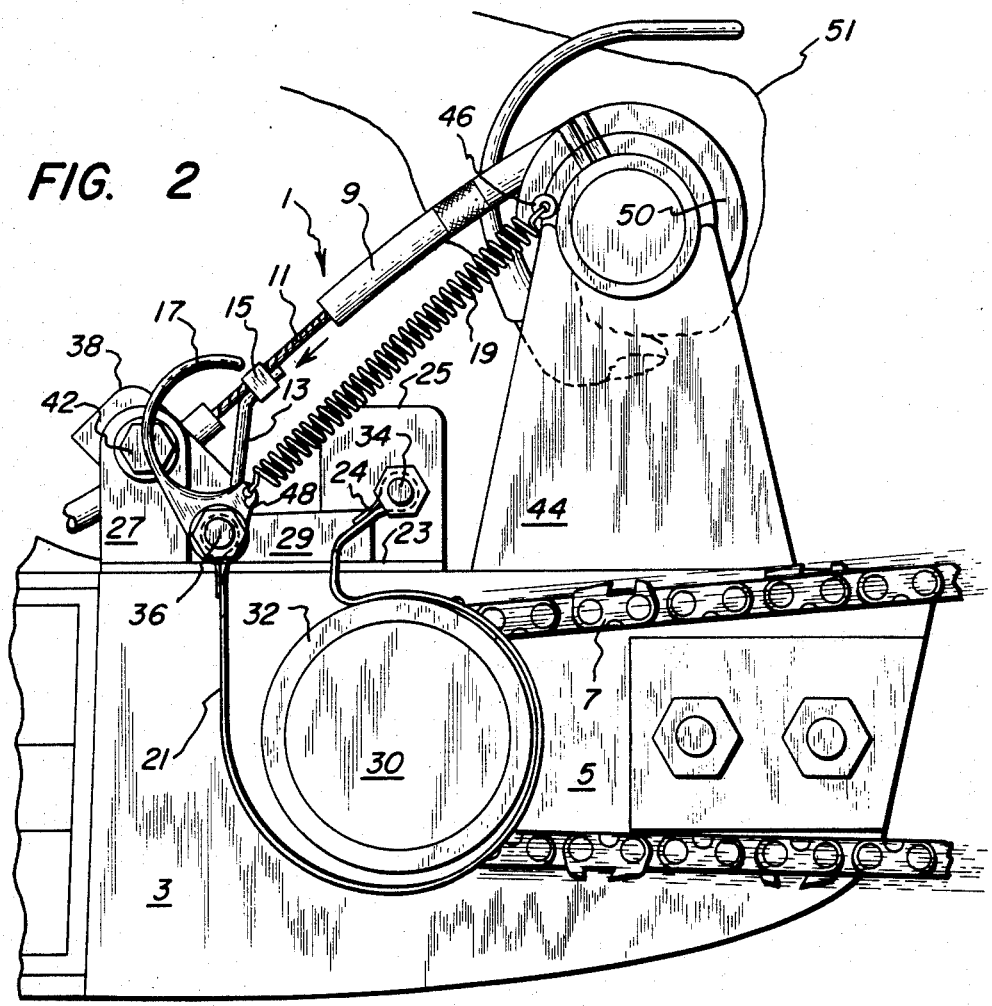
FIG. 2 is a view similar to FIG. 1 wherein the cutter chain is in a non-braked condition.

As shown in FIG. 2 and 2a the brake band 21 extends through the elongated opening 4 in housing 3 and is disposed around the peripheral surface of the clutch outer drum 32. The torsion spring 19 is shown broken away to reveal the brake band 21 anchored at one end to the threaded anchor shaft 34 by means of looped end 24, locking nut 66 and locking nut 68. Said anchor shaft 34 being afixed to mounting pedistal 25 via drilled hole (not shown) with with anchor shaft head 62 on one side of pedistal 25 and locking nut 64 on the other side. The threaded anchor shaft 34 allows appropriate lateral adjustment of brake band 21 and easy removal thereof for maintenance.

The brake stopping mechanism includes a spring 19 which continually biases the actuating shaft 36, which carries one end of brake band 21, towards a braking posture. The spring composes a torsion spring 19 that is mounted relatively to the actuating shaft 36. This spring includes a brake activation end that is connected to the reset grip 17 which is carried on actuating shaft 36 by being hooked through aperture 48 to continuously urge the actuating shaft 36 forwardly. The other end of spring 19 is connected to front handle pedistal mount 44 by being hooked through aperture 46.

Depicted in FIGS. 1 and 1a is an actuating shaft trigger 38 which comprises leg 39 and foot 58, pivotly mounted on mounting pedistal 27 by mounting bolt 42 via drilled hole (not shown) in pedistal 27 and drilled hole (not shown) in trigger leg 39. Carried on mounting bolt 42 in a position on one side of trigger 38 is washer 52, carried on the opposite side of trigger 38 is washer 54 with locking nut 56.

Shown is a cable sheath 9 which freely receives in reciprocable relationship therein a cable 11. Cable 11 being operatively connected to rotatively mounted front handle 50. Actuating shaft trigger 38 is operatively connected to cable 11 by linkage 13 and fixed plug 15. Actuating shaft trigger 38 operatively carries a curved end 14 of linkage 13 in aperture 16. The other end of linkage 13 is fixedly connected to cable 11 by means of fixed plug 15.

As the rotatively mounted front handle 50 is rotated clockwise, either automatically in a "kick-back" situation or manually by the operator at his option, cable 11 is reciprocated toward said handle 50 in an upward direction. Such upward movement being caused by the elevated mounting position of handle 50. This movement of cable 11 causes fixed plug 15, which carries one end of linkage 13, to move in relationship with cable 11. The result of said action being that linkage 13 is moved in a forwardly and upwardly direction and exerts a lifting force on trigger 38 to operatively lift said trigger to an elevated position. It is understood that the end of linkage 13, which is connected to trigger leg 39 is allowed to swivel in aperture 16 as linkage 13 is moved in a forward or backward direction.

FIGS. 1 and 1a show the present invention in a braking posture with the brake band 21 tigthened around the periphery of the clutch outer drum 32 by the biasing force of the torsion spring 19 to impose frictional forces against drum 32 and stop the cutter chain 7.

FIGS. 2 and 2a show the present invention in a non braking posture. The actuating shaft 36 is releasably received in recess 40 with its unthreaded end resting on the trigger foot 58, as a biasing force is being exerted by torsion spring 19 to dispose the actuateing shaft 36 toward its braking posture. The invention, being in this posture, the brake band 21 is disposed loosely around the outer drum 32 so that no braking forces are exerted.

FIG. 2a shows the mounting bracket 23 of the present invention afixed to the saw housing 3 by means of cap (machine) screws 60, of which there are two, via drilled holes (not shown) in bracket 23 and tapped holes (not shown) in housing 3.

OPERATION

In utilizing the chain saw invention described herein, the housing 3 is manually supported by an operator who grasps a rotatively mounted front handle 50 during operation of the chain saw. The handle 50 is in its appropriate normal position. While in this position, the invention is set in a non-braking condition with actuating shaft 36 releaseably held by being received in recess 40 and resting on the foot 58 of trigger 38 as forwardly biasing force is being exerted on actuating shaft 36 by torsion spring 19.

In the event that the rotatively mounted front handle 50 is rotated clockwise, either automatically as by the twisting action of "kick-back" or manually by the operator at his option, the following will occur. Cable 11 is reciprocated toward the handle 50 in a upward direction to cause fixed plug 15 to move accordingly and by means of linkage 13 elevate trigger foot 58. This movement correspondingly lifts and releases actuating shaft 36 from recess 40. Being biased forward by torsion spring 19, actuating shaft 36 is positively moved forward along the surface of actuating shaft guide 29 to instantly dispose and tighten brake band 21 around clutch outer drum 32 which causes frictional forces to bring the cutter chain 7 to a complete stop. It will be understood that once the cutter chain has been halted, operation of the chain saw may be resumed by manually resetting the invention to its non-braking posture. Front handle 50 is rotated counterclockwise, correspondingly, by means of cable and linkage, trigger 38 is pivoted to its lowered position. The operator, by grasping with one finger, reset grip 17, retracts rearward actuating shaft 36 along the surface of actuating shaft guide 29 and lowers said actuating shaft into receivership with recess 40 to rest on trigger foot 58. Brake band 21 is now released from it's frictional grip on clutch outer drum 32.

SUMMARY OF MAJOR ADVANTAGES AND SCOPE OF THE INVENTION

Those skilled in the chain saw art and familiar with the present disclosure may well envision alternative arrangements in addition to those described and will recognize that the invention may be practiced in a variety of structural formats. In short, while additions, deletions, substitutions or modifications in relation to the disclosed embodiments may be effective in practicing the invention, such changes would be deemed to fall within the purview of the present invention to the extent encompassed by the appended claims.

Having thusly described my invention, I claim:

1. In a chain saw having a housing means, a drive means driving a cutting chain and a rotatively mounted front handle means that rotates about an axis through the grip portion of the handle which is grasped and held by the human operator, a safety stop means operatively connected to said rotatively mounted front handle to cause said safety stop to actuate via actuating means in response to the rotation of said front handle and stop said cutting chain; said safety stop comprising a friction brake band a mounting bracket means mounted on said housing means, anchor shaft means connecting said brake band to said bracket, actuating shaft means connected is the other end of said brake band, said actuating shaft means being constantly biased toward an actuated posture by a spring means and a recess in said bracket to position said actuating shaft means in a non-actuated position, and a resetting means to be grasp by an operator to reposition said actuating shaft to a non-actuated posture.

2. A safety stop means in accordance with claim 1, wherein said mounting bracket means is externally mounted on said housing means and carries as a part thereof two mounting pedistals and a recess.

3. A safety stop means in accordance with claim 1, wherein said anchor shaft is mounted by one end to one of the two mounting pedistals of said mounting bracket and fixedly carries on it's opposite end one of two looped ends of said friction brake band, said friction brake band comprising a flexible band which extends internally through an elongated opening in said housing means to encircle an outter drum of said drive means, the second looped end of said friction brake band protruding externally through said elongated opening in said housing.

4. A safety stop means in accordance with claim 1, wherein said actuating shaft means is being carried in the second looped end of said friction brake band, said actuating shaft being continuously biased forward by said spring means to cause said friction brake band to tighten around said outer drum of said drive means.

5. A safety stop means in accordance with claim 1, wherein said safety stop means comprises a said recess, a fixed plug and a trigger foot, said trigger foot being mechanically mounted to allow movement, on of said mounting bracket means, said trigger foot being positioned to release biasing force of said spring means upon said actuating shaft means, said fixed plug being operatively connected to said rotatively mounted front handle and to said trigger foot to effect movement of said fixed plug and trigger foot in response to said front handle being rotated, such movement causing said trigger foot to be elevated and release said actuating shaft from being received in said recess to dispose said actuating shaft to its actuated posture to be biased forward by said spring means and stop said cutting chain, said actuating shaft fixedly carries thereon a grip which is grasped by the human operator to reset said actuating shaft to its releasably held non-actuated posture in said recess.

* * * * *